Dec. 29, 1925.
P. SIEVER
1,567,338
SPARE TIRE SIGN AND PROTECTOR
Filed May 14, 1925    2 Sheets-Sheet 1
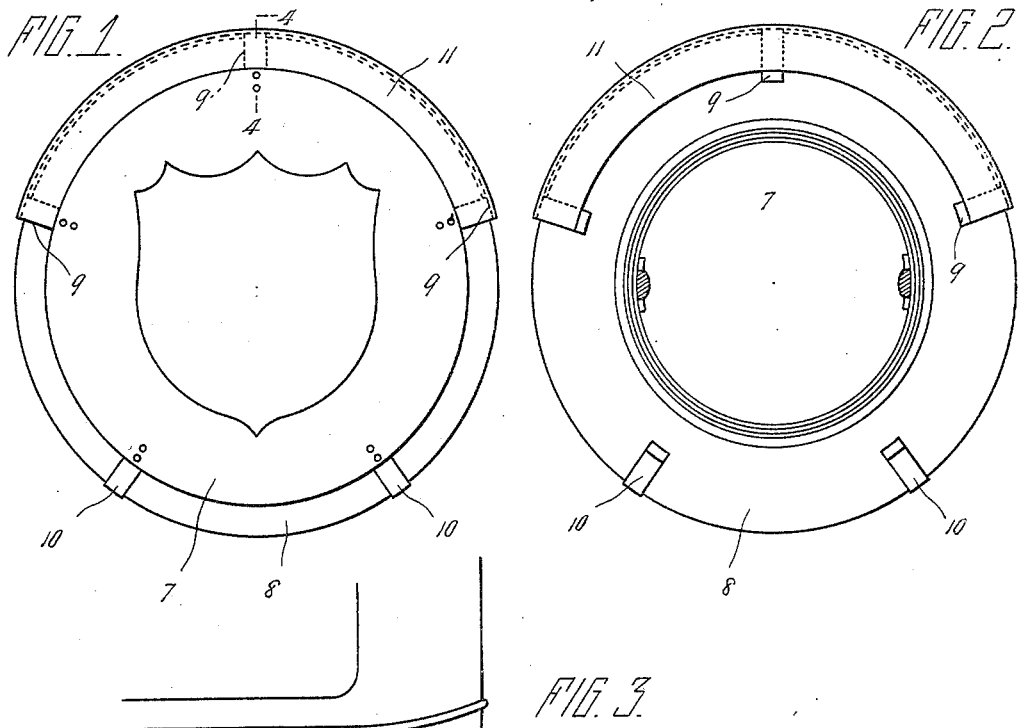
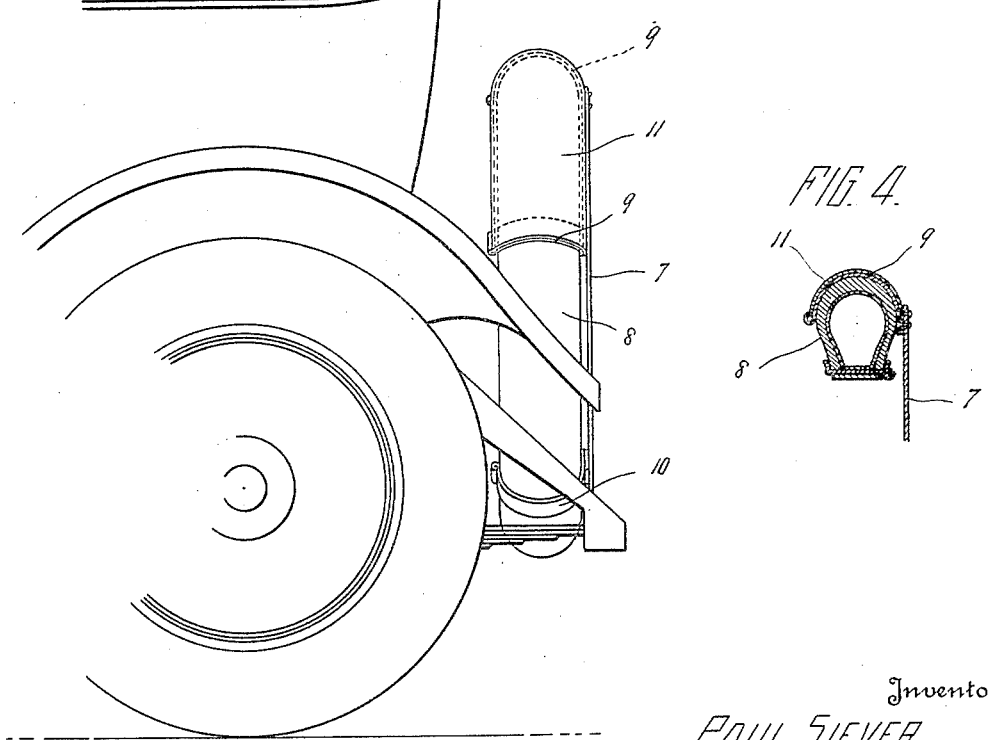
Inventor:
PAUL SIEVER
By Monroe E. Miller
Attorney

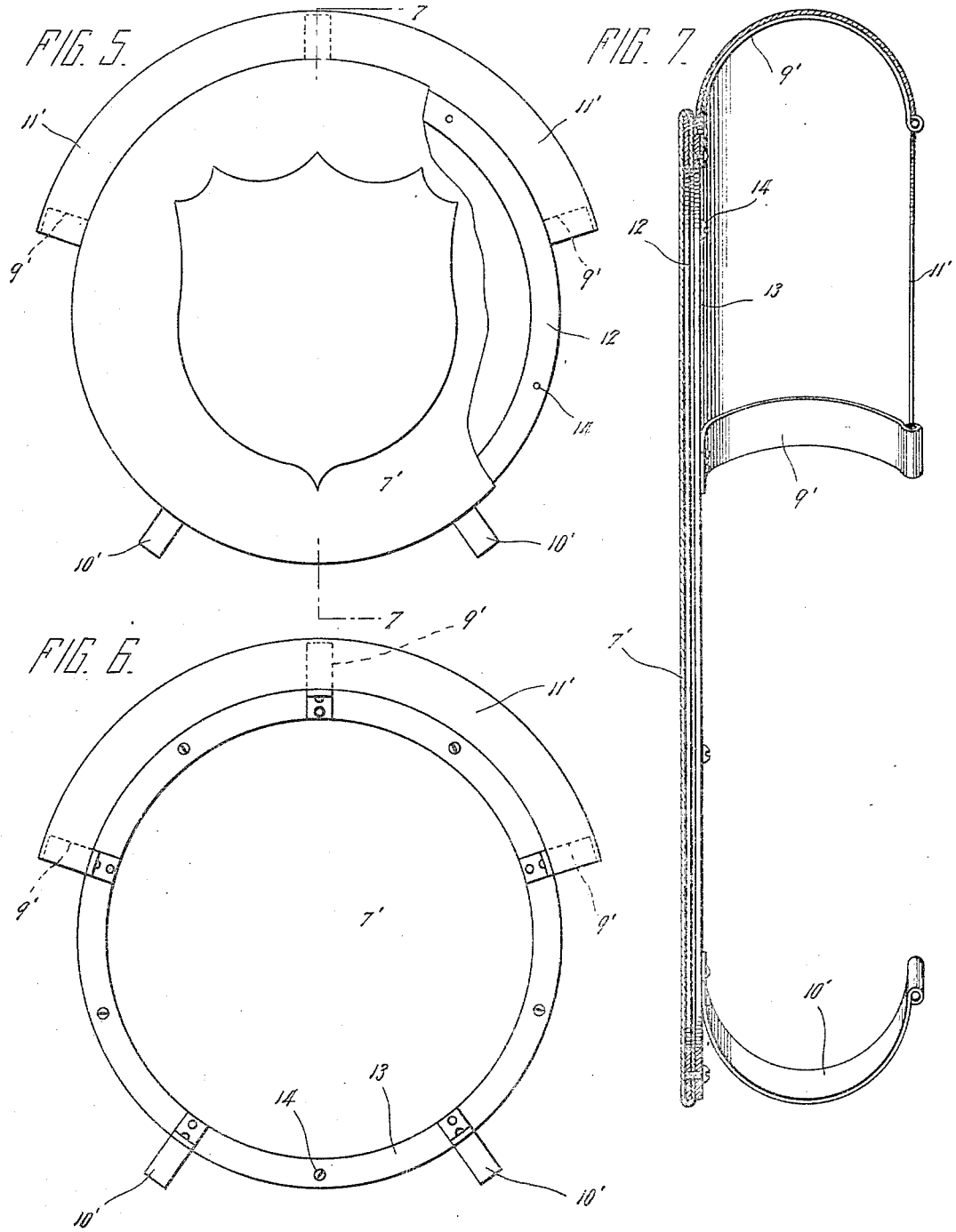

Patented Dec. 29, 1925.

1,567,338

UNITED STATES PATENT OFFICE.

PAUL SIEVER, OF MINNEAPOLIS, MINNESOTA.

SPARE-TIRE SIGN AND PROTECTOR.

Application filed May 14, 1925. Serial No. 30,322.

*To all whom it may concern:*

Be it known that I, PAUL SIEVER, a citizen of the United States, residing at Minneapolis, in the county of Hennepin and State of Minnesota, have invented certain new and useful Improvements in a Spare-Tire Sign and Protector, of which the following is a specification, reference being had therein to the accompanying drawing.

The present invention has for its object the provision of a combination sign and protector for use on the spare tire of an automobile.

The device is adapted to be applied to the spare tire of an automobile to display a desired sign as well as to protect the tire from the sun's rays, rain and the other elements. The device is also readily removable, when the display of the sign is not wanted, or when the tire is called into use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a front view of the device as applied.

Fig 2 is a rear view thereof.

Fig. 3 is a side elevation.

Fig. 4 is a sectional detail on the line 4—4 of Fig. 1.

Fig. 5 is a front view illustrating a modification, a portion of the sheet or panel being broken away.

Fig. 6 is a rear view of the device shown in Fig. 5.

Fig. 7 is an enlarged section on the line 7—7 of Fig. 5.

The device comprises a disk or plate 7 of stiff sheet metal or other suitable material, to be disposed across the opening of the spare tire 8 carried by an automobile, with the edge of the plate overlapping the tire. The exposed surface of the plate may contain any suitable sign, such as an advertisement.

The plate 7 is detachably secured to the tire 8. Thus, three upper and two lower curved leaf springs 9 and 10, respectively, are riveted or otherwise secured to the plate 7, preferably at the rear side thereof, and are composed of resilient material in order that said springs may be readily sprung apart to move over the tire in applying and removing the device. Said leaf springs extend across the tread of the tire 8 partially around the tire, in order to hold the plate 7 against the tire.

An arched tire cover 11 of suitable fabric or other flexible material is secured on the upper leaf springs 9 with its forward edge behind the upper edge of the plate 7. Said cover is convexed longitudinally and transversely so as to extend and fit snugly over the upper portion of the tire, to protect the tire from rays of the sun and from rain, snow and sleet.

The device is quickly applied and removed, and may be employed for displaying a sign or advertisement in addition to protecting the tire. The device may be used for converting a pleasure car into a taxicab. Thus, the plate or panel 7 may contain a taxicab sign to be applied to the spare tire, and the device may be removed when the car is used for pleasure or other purposes, other than for taxicab service. The device may also be applied to a spare tire either at the rear end or one side of the car.

Figs. 5, 6 and 7 illustrate a modification wherein a sheet or panel is detachably connected with a frame that is applied to the tire. The frame comprises the rings 12 and 13 secured together detachably by means of the screws 14 which engage through the rear ring 13 and screw into the front ring 12. The leaf springs 9' and 10' are riveted or otherwise secured to the ring 13 to engage the tire, and the tire cover 11' is secured on the leaf springs 9'. A sheet or panel 7' containing any suitable sign or advertisement is stretched across the outer side of the ring 12 and has its edge or marginal portion bent back and clamped between the rings 12 and 13. Said sheet or panel may be of cloth or other suitable fabric or material, and said sheet or panel may be readily detached and replaced by detaching the rings or frame members 12 and 13.

Having thus described the invention, what is claimed as new is:—

A device of the character described comprising a panel to be disposed across a spare tire, upper and lower curved leaf springs connected to the panel to engage across the tread of the tire at the upper and lower portions of the tire and holding the panel in place against the tire, and a transversely and longitudinally convexed tire cover mounted on and carried by the upper leaf springs to be applied over the upper portion of the tire when the panel is applied to the tire.

In testimony whereof I hereunto affix my signature.

PAUL SIEVER.